(12) United States Patent
Nakagawa

(10) Patent No.: US 12,547,357 B2
(45) Date of Patent: Feb. 10, 2026

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Masashi Nakagawa, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/888,007

(22) Filed: Sep. 17, 2024

(65) Prior Publication Data

US 2025/0013409 A1 Jan. 9, 2025

Related U.S. Application Data

(63) Continuation of application No. 18/059,740, filed on Nov. 29, 2022, now Pat. No. 12,112,084, which is a
(Continued)

(30) Foreign Application Priority Data

Sep. 14, 2018 (JP) .................................. 2018-172655

(51) Int. Cl.
*G06F 3/12* (2006.01)
*G06F 9/4401* (2018.01)

(52) U.S. Cl.
CPC .......... *G06F 3/1277* (2013.01); *G06F 3/1204* (2013.01); *G06F 3/1254* (2013.01); *G06F 9/4411* (2013.01)

(58) Field of Classification Search
CPC .... G06F 3/1245; G06F 3/1248; G06F 3/1227; G06F 3/1277
See application file for complete search history.

(56) References Cited

U.S. PATENT DOCUMENTS

2006/0139679 A1* 6/2006 Barry ................. G06K 15/1857
358/1.13
2007/0300216 A1* 12/2007 Miyagi ................. G06F 3/1288
717/168
(Continued)

FOREIGN PATENT DOCUMENTS

JP 2014215945 A 11/2014

*Primary Examiner* — Benjamin O Dulaney
(74) *Attorney, Agent, or Firm* — Canon U.S.A., Inc. IP Division

(57) ABSTRACT

An information processing apparatus includes a printer driver configured to generate a print command compliant with a predetermined printing protocol based on print data obtained from a data generation application, one or more extension modules configured to generate a print command compliant with another printing protocol different from the predetermined printing protocol, a storage unit configured to store information associating the one or more extension modules to be used for generating the print command compliant with said another printing protocol with the printer driver, and an output unit configured to output the print command compliant with said another printing protocol, the print command being obtained through processing of the print data obtained by the printer driver, and the processing being performed by the one or more modules indicated by the information.

10 Claims, 10 Drawing Sheets

Related U.S. Application Data continuation of application No. 16/568,080, filed on Sep. 11, 2019, now Pat. No. 11,531,507.

(56) References Cited

U.S. PATENT DOCUMENTS

| | | | | |
|---|---|---|---|---|
| 2009/0083625 | A1* | 3/2009 | Liu | G06F 3/1247 |
| | | | | 358/1.15 |
| 2009/0190150 | A1* | 7/2009 | Selvaraj | G06F 3/1288 |
| | | | | 358/1.15 |
| 2011/0273741 | A1* | 11/2011 | Mukasa | G06F 3/1206 |
| | | | | 358/1.15 |
| 2012/0218576 | A1* | 8/2012 | Sekine | G06F 3/1204 |
| | | | | 358/1.13 |
| 2013/0194601 | A1* | 8/2013 | Nakagawa | G06F 3/1285 |
| | | | | 358/1.13 |
| 2013/0215474 | A1* | 8/2013 | Caton | H04N 1/00883 |
| | | | | 358/3.28 |
| 2014/0293312 | A1* | 10/2014 | Fukasawa | G06F 3/1255 |
| | | | | 358/1.15 |
| 2015/0261489 | A1* | 9/2015 | Aoki | G06F 3/1247 |
| | | | | 358/1.15 |
| 2015/0309759 | A1* | 10/2015 | Mori | G06F 3/1256 |
| | | | | 358/1.15 |
| 2017/0039014 | A1* | 2/2017 | Mori | G06F 3/1288 |
| 2017/0124347 | A1* | 5/2017 | Kamata | G16H 10/60 |
| 2018/0077305 | A1* | 3/2018 | Nishio | H04N 1/00962 |
| 2018/0267750 | A1* | 9/2018 | Kobayashi | G06F 3/1205 |
| 2018/0314475 | A1* | 11/2018 | Nishio | G06F 3/122 |
| 2018/0316804 | A1* | 11/2018 | Reina | H04N 1/00228 |
| 2019/0107977 | A1* | 4/2019 | Yokoohji | G06F 3/1288 |

* cited by examiner

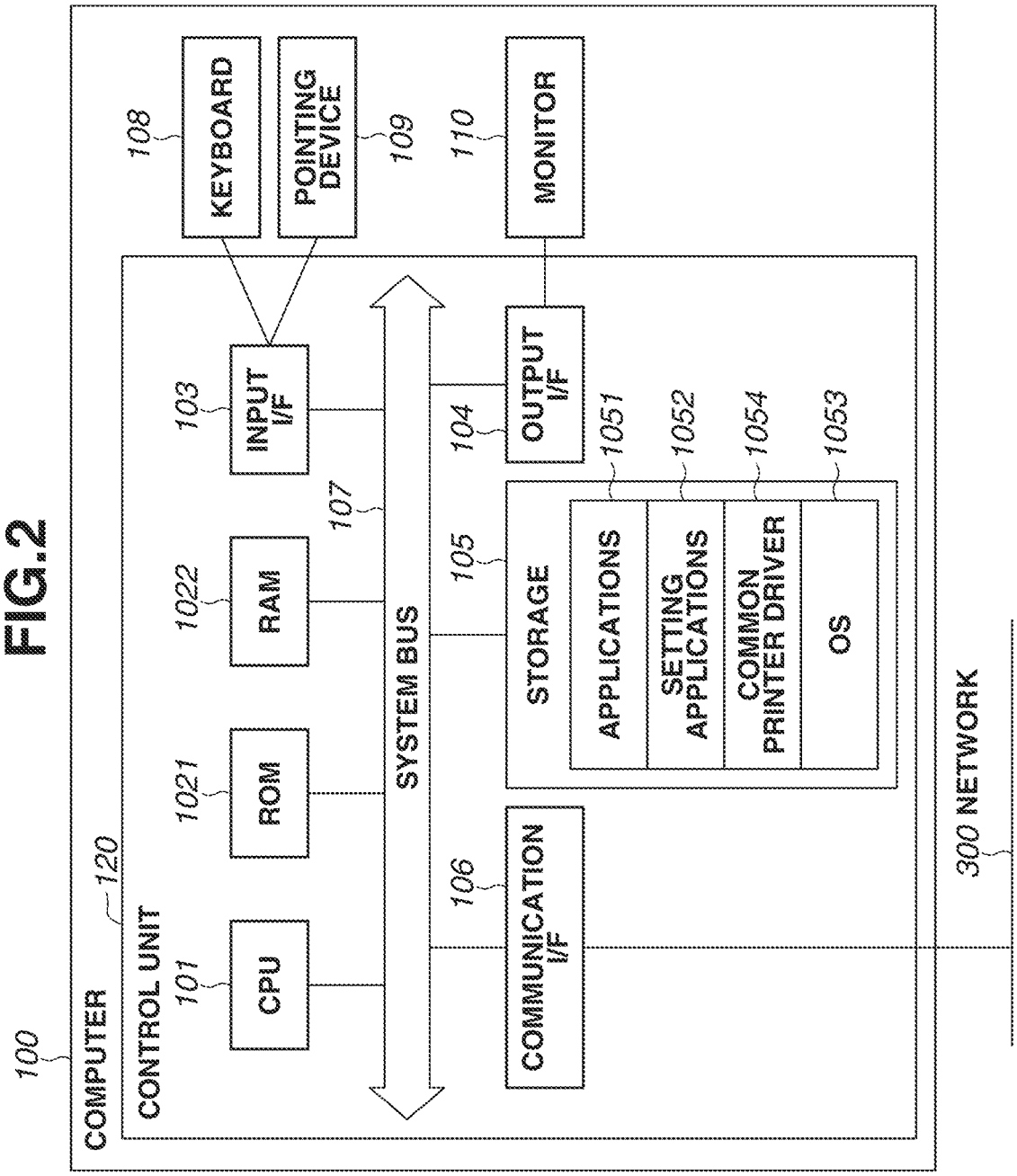

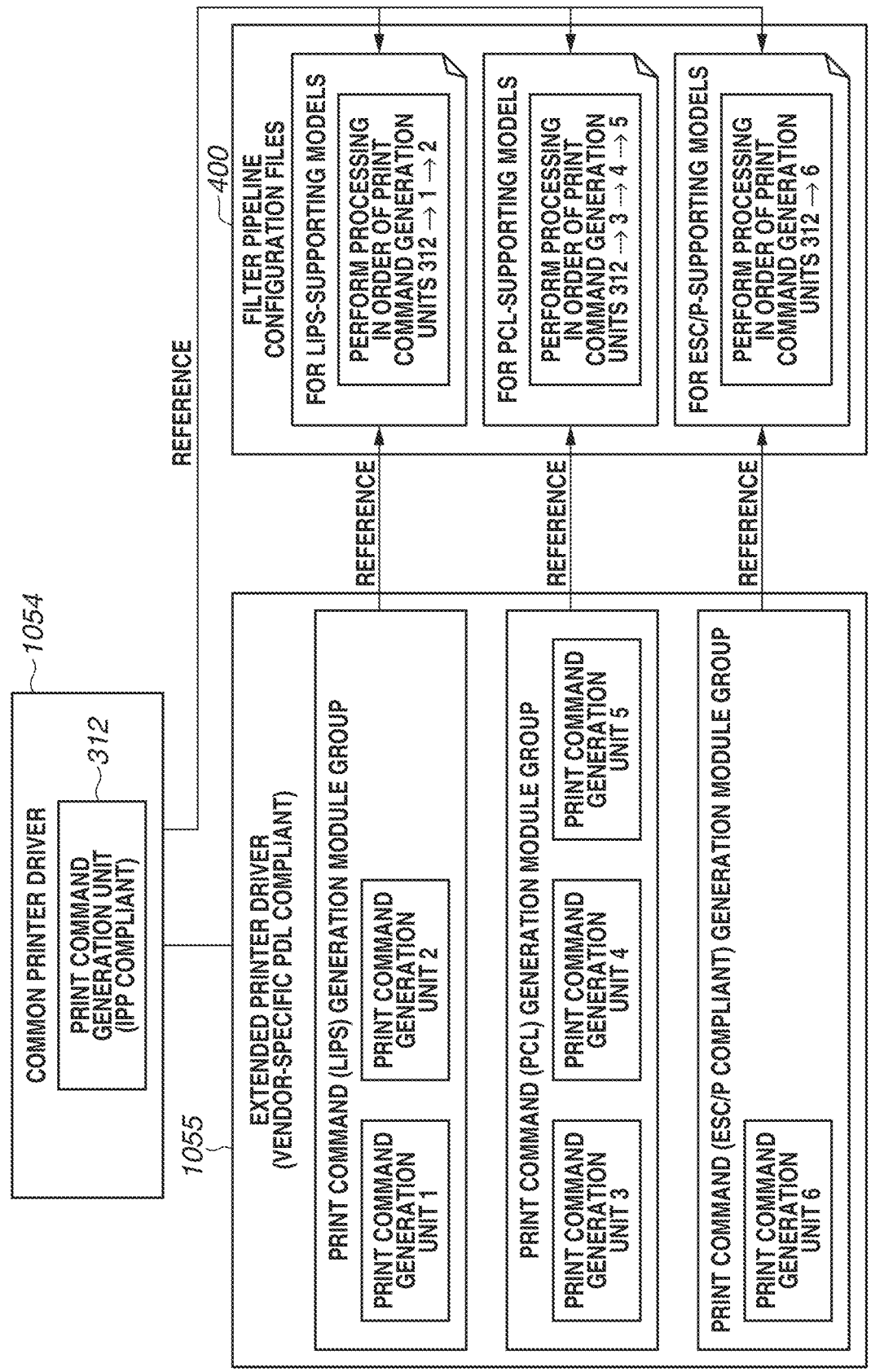

```xml
<?xml version="1.0"?>
<Filters>
    <Filter name="XPS to PDF" clsid="{ZZZZZZZZ-ZZZZ-ZZZZ-ZZZZ-ZZZZZZZZZZZZ}" dll="PDFRenderFilter.dll">
        <Input Comment="IID_IXpsDocumentProvider" guid="{aaaaaaaa-aaaa-aaaa-aaaa-aaaaaaaaaaaa}"/>
        <Output guid="{bbbbbbbb-bbbb-bbbb-bbbb-bbbbbbbbbbbb}" comment="IID_IPrintWriteStream"/>
    </Filter>

<Filter name="Vendor Renderer PDL A" clsid="{YYYYYYYY-YYYY-YYYY-YYYYYYYYYYYY}" dll="VendorRenderFilterA.dll">
        <Input Comment="IID_IXpsDocumentProvider" guid="{cccccccc-cccc-cccc-cccc-cccccccccccc}"/>
        <Output guid="{dddddddd-dddd-dddd-dddd-dddddddddddd}" comment="IID_IPrintWriteStream"/>
    </Filter>

<Filter name="Vendor Renderer PDL B" clsid="{XXXXXXXX-XXXX-XXXX-XXXXXXXXXXXX}" dll="VendorRenderFilterB.dll">
        <Input Comment="IID_IXpsDocumentProvider" guid="{eeeeeeee-eeee-eeee-eeee-eeeeeeeeeeee}"/>
        <Output guid="{ffffffff-ffff-ffff-ffff-ffffffffffff}" comment="IID_IPrintWriteStream"/>
    </Filter>

. . .

</Filters>
```

```xml
<?xml version="1.0"?>
<Filters>

<Filter name="Vendor Renderer PDL A" clsid="{YYYYYYYY-YYYY-YYYY-YYYYYYYYYYYY}" dll="VendorRenderFilterA.dll">
        <Input Comment="IID_IXpsDocumentProvider" guid="{cccccccc-cccc-cccc-cccc-cccccccccccc}"/>
        <Output guid="{dddddddd-dddd-dddd-dddd-dddddddddddd}" comment="IID_IPrintWriteStream"/>
    </Filter>

<Filter name="Vendor Renderer PDL B" clsid="{XXXXXXXX-XXXX-XXXX-XXXXXXXXXXXX}" dll="VendorRenderFilterB.dll">
        <Input Comment="IID_IXpsDocumentProvider" guid="{eeeeeeee-eeee-eeee-eeee-eeeeeeeeeeee}"/>
        <Output guid="{ffffffff-ffff-ffff-ffff-ffffffffffff}" comment="IID_IPrintWriteStream"/>
    </Filter>

. . .

</Filters>
```

FIG.4C

```
400c
<?xml version="1.0"?>
<Filters>
    <Filter name="Vendor Renderer PDL A" clsid="{YYYYYYYY-YYYY-YYYY-YYYYYYYYYYYY}" dll="VendorRenderFilterA.dll">
        <Input Comment="IID_IXpsDocumentProvider" guid="{cccccccc-cccc-cccc-cccc-cccccccccccc}"/>
        <Output guid="{dddddddd-dddd-dddd-dddd-dddddddddddd}" comment="IID_IPrintWriteStream"/>
    </Filter>

<Filter name="Vendor Renderer PDL B" clsid="{XXXXXXXX-XXXX-XXXX-XXXXXXXXXXXX}" dll="VendorRenderFilterB.dll">
        <Input Comment="IID_IXpsDocumentProvider" guid="{eeeeeeee-eeee-eeee-eeee-eeeeeeeeeeee}"/>
        <Output guid="{ffffffff-ffff-ffff-ffff-ffffffffffff}" comment="IID_IPrintWriteStream"/>
    </Filter>

<Filter name="Vender Renderer PDLC" clsid="{ZZZZZZZZ-ZZZZ-ZZZZ-ZZZZ-ZZZZZZZZZZZZ}" url="Http://xxx.yyy.zzz">
        <Input Comment="IID_IXpsDocumentProvider" guid="{aaaaaaaa-aaaa-aaaa-aaaa-aaaaaaaaaaaa}"/>
        <Output guid="{bbbbbbbb-bbbb-bbbb-bbbb-bbbbbbbbbbbb}" comment="IID_IPrintWriteStream"/>
    </Filter>
</Filters>
```

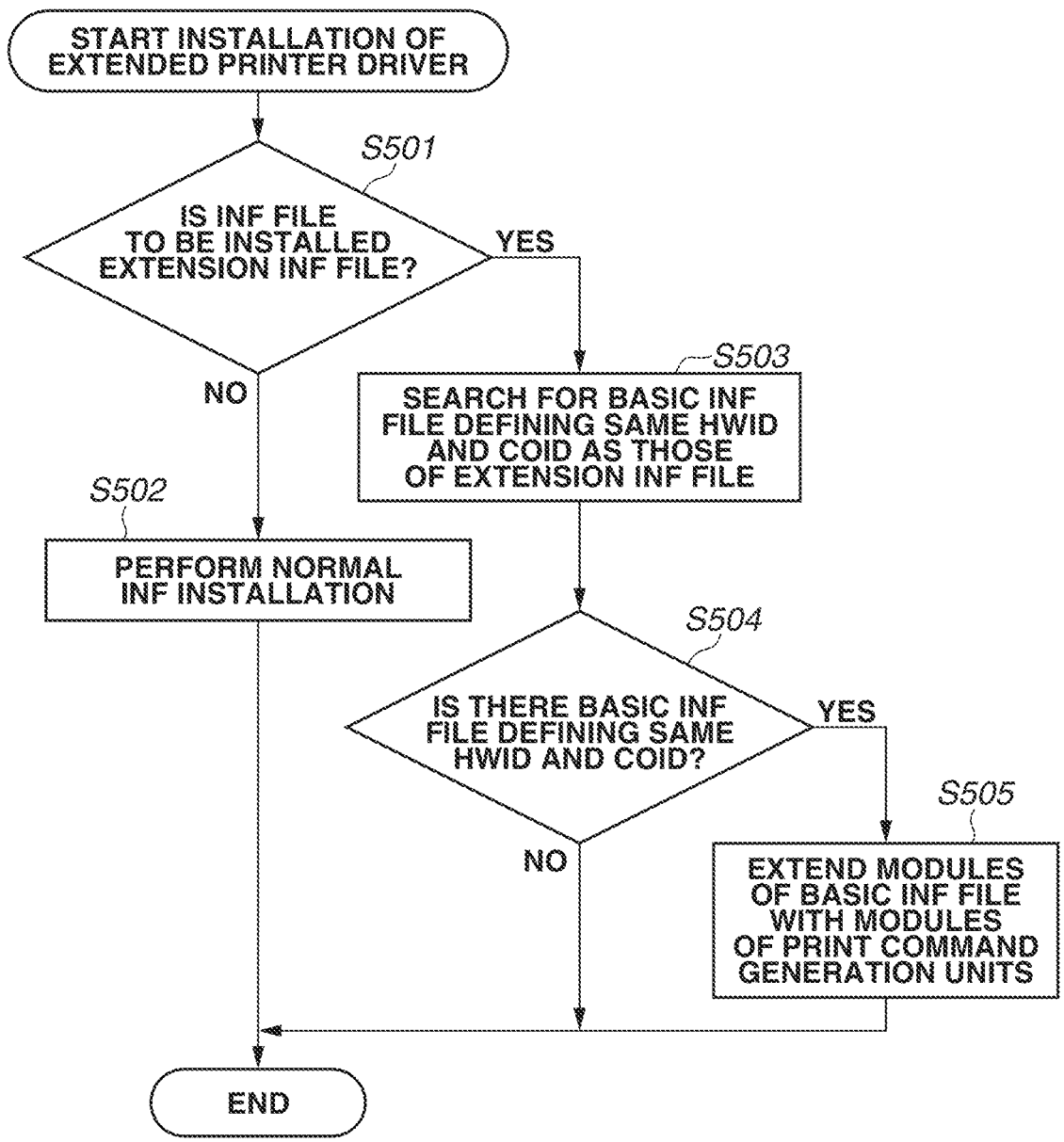

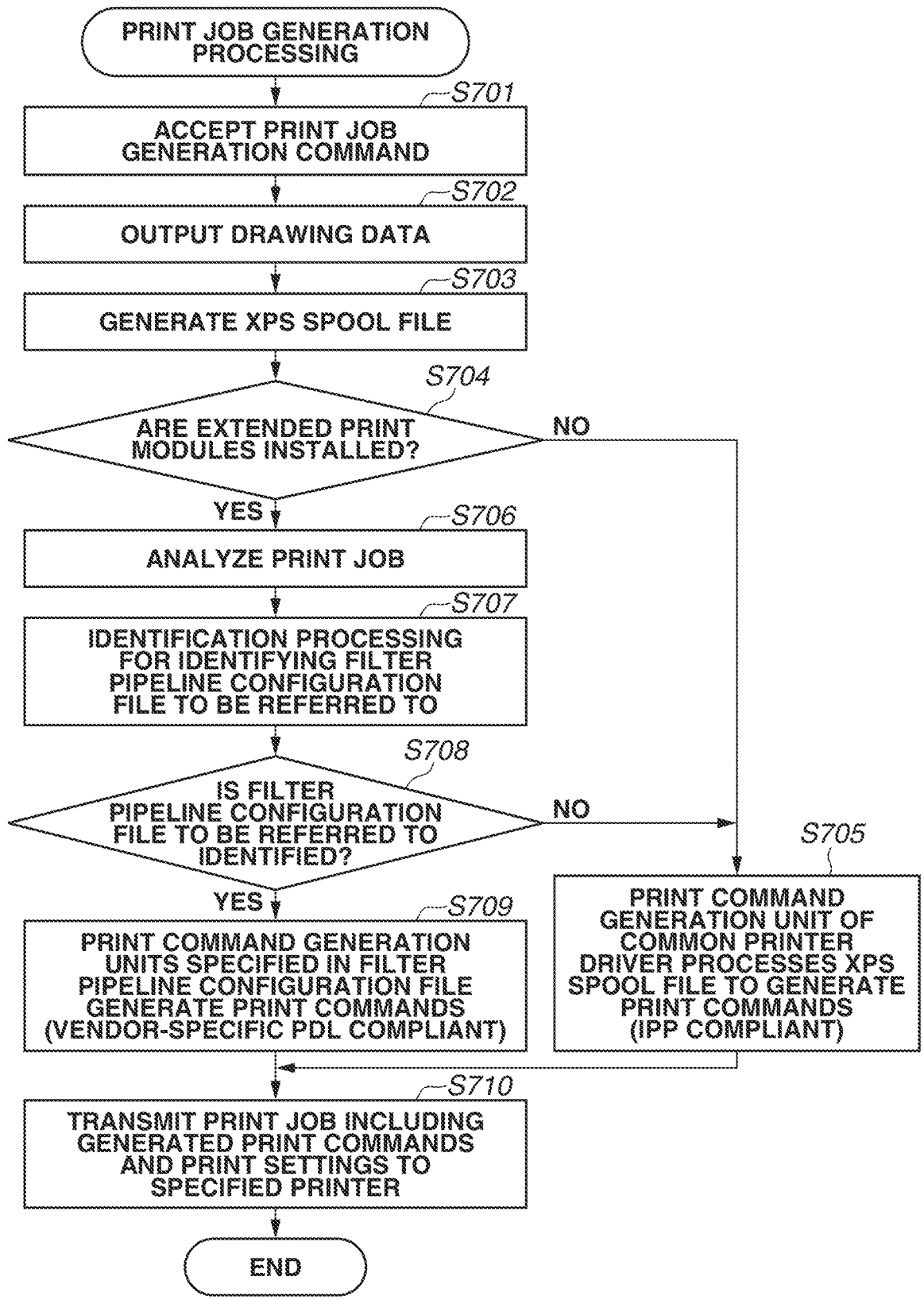

INFORMATION PROCESSING APPARATUS, METHOD FOR CONTROLLING INFORMATION PROCESSING APPARATUS, AND STORAGE MEDIUM

CROSS-REFERENCE TO RELATED APPLICATIONS

This application is a Continuation of U.S. patent application Ser. No. 18/059,740, filed Nov. 29, 2022, which is a Continuation of U.S. patent application Ser. No. 16/568,080, filed Sep. 11, 2019, now U.S. Pat. No. 11,531,507, which claims the benefit of Japanese Patent Application No. 2018-172655, filed Sep. 14, 2018, all of which are hereby incorporated by reference herein in their entirety.

BACKGROUND

Field of the Disclosure

The present disclosure relates to an information processing apparatus for generating a print command, a method for controlling the information processing apparatus, and a storage medium.

Description of the Related Art

Configurations for transmitting a print job to a printing apparatus by using a printer driver have been commonly known. An operating system (OS) that is basic software is installed on an information processing apparatus, and the printer driver is configured based on a printing architecture defined by the OS and is called by the OS for operation. Vendors providing printing apparatuses provide printer drivers conforming to OS specifications. The OS and the printer drivers cooperate to provide a function of performing printing by using the printing apparatuses.

As a printer driver in using Microsoft® Windows® 8.1 or later versions as the OS, there is an architecture called version 4 (V4) printer driver. The V4 printer driver enables vendors providing printing apparatuses to provide dedicated applications for assisting printer driver functions. Such applications are called Universal Windows Platform (UWP) device apps. UWP device apps can be obtained from a store application (Windows Store application (WSA)) and installed on information processing apparatuses. The V4 printer driver can be linked with printer extensions that are print setting applications for making vendor-specific print settings.

A printer driver called universal printer driver has heretofore been known as a printer driver for controlling a plurality of types of printing apparatuses having different functions (Japanese Patent Application Laid-Open No. 2009-301312). This printer driver can generate print jobs by appropriately processing data into drawing data for respective printing apparatuses model by model.

Universal printer drivers such as one discussed in Japanese Patent Application Laid-Open No. 2009-301312 are typically provided by respective vendors. A universal printer driver can therefore support a plurality of types of printing apparatuses provided by the same vendor. It is difficult, however, for a universal printer driver to support printing apparatuses provided by different vendors. The number of types of formats of page description language (PDL) supported by a universal printer driver is one or at most two. By contrast, PDL formats supported by vendors have been independently developed by the vendors, and there are a large variety of PDL formats to maximize the features of the printing apparatuses. Some printing apparatuses only accept a certain PDL data format. Transmitting data in other formats can cause an error or lead to printing of data different from instructions.

Under the circumstances, the use of mechanisms compliant with the Internet Printing Protocol (IPP), typified by IPP Everywhere®, has been being examining. In other words, the provision of a common printer driver or print client using the IPP is considered. IPP Everywhere is a printing protocol for enabling printing by various printing apparatuses irrespective of vendors.

For example, Ubuntu® 17.04 includes, as one of its default OS functions, a mechanism for transmitting a print job to a printing apparatus supporting IPP Everywhere®.

A common printer driver compliant with such a printing protocol as the IPP is unable to use functions independently provided by vendors, or properly output vendor-specific PDL data.

SUMMARY

According to embodiments of the present disclosure, an information processing apparatus includes a printer driver configured to generate a print command compliant with a predetermined printing protocol based on print data obtained from a data generation application, one or more extension modules configured to generate a print command compliant with another printing protocol different from the predetermined printing protocol, a storage unit configured to store information associating the one or more extension modules to be used for generating the print command compliant with said another printing protocol with the printer driver, and an output unit configured to output the print command compliant with said another printing protocol, the print command being obtained through processing of the print data obtained by the printer driver, and the processing being performed by the one or more modules indicated by the information.

Further features of the present disclosure will become apparent from the following description of exemplary embodiments with reference to the attached drawings.

BRIEF DESCRIPTION OF THE DRAWINGS

FIG. 2 is a diagram illustrating an example of a hardware configuration of a computer.

FIG. 3B is a diagram illustrating details of a software configuration of drivers in the computer.

FIGS. 4A to 4C are diagrams illustrating examples of a filter pipeline configuration file.

FIG. 5 is a flowchart for describing an installation processing procedure of an extended printer driver according to a first exemplary embodiment.

FIG. 7 is a flowchart for describing print job generation processing according to the first exemplary embodiment.

DESCRIPTION OF THE EMBODIMENTS

Exemplary embodiments are described below with reference to the drawings. The following exemplary embodiments are not intended to limit the invention set forth in the claims. In some embodiments, all combinations of features described in the exemplary embodiments are not necessarily included.

Figure 1:
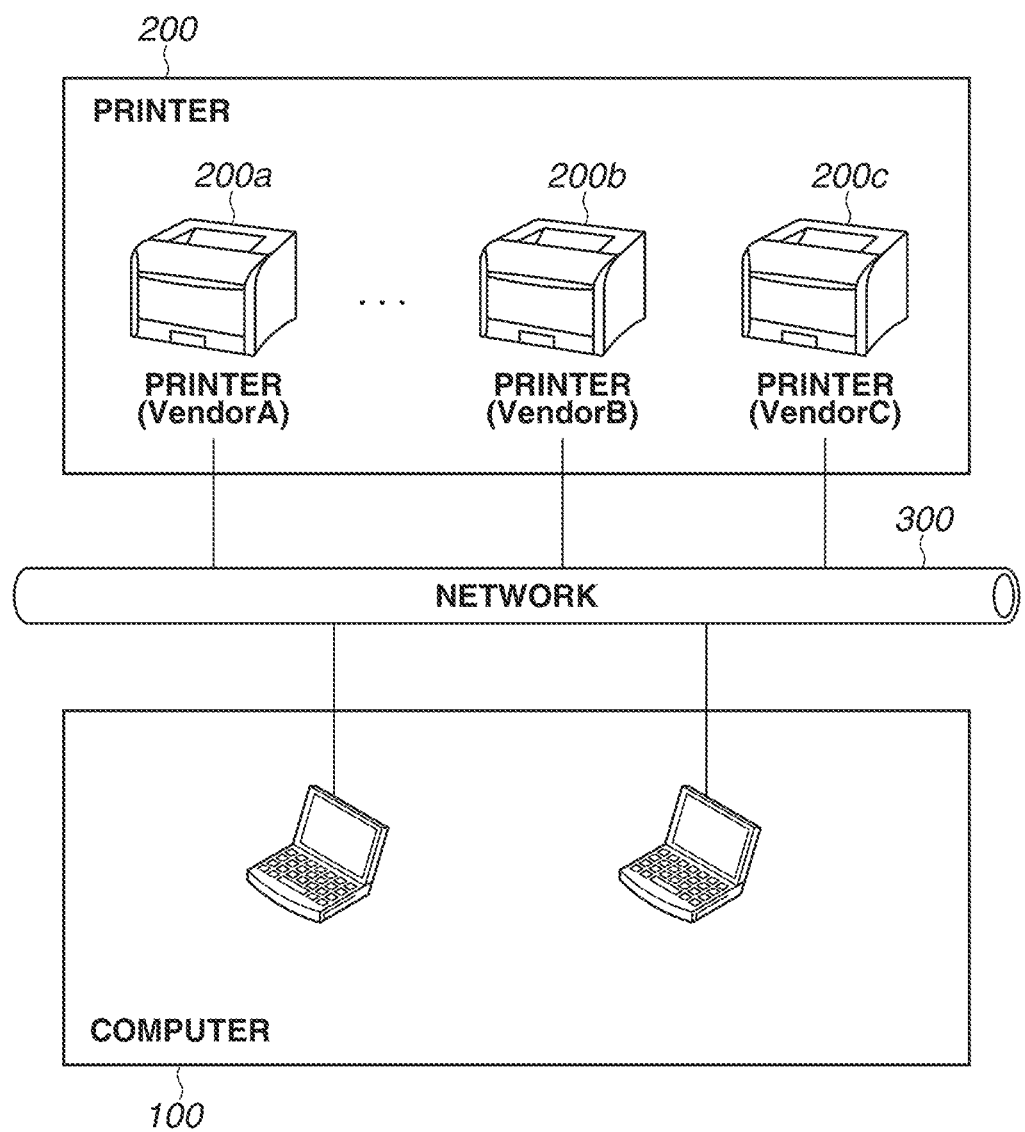
FIG. 1 is a diagram illustrating an example of a printing system.

A first exemplary embodiment of the present disclosure will be described below. A configuration of a printing system according to the present exemplary embodiment will initially be described with reference to FIG. 1. The printing system according to the present exemplary embodiment includes computers 100 and printers 200a to 200c. The computers 100 and printers 200a to 200c are mutually communicably connected on a network 300. The communication between the devices may be implemented via a wireless network or via a wired network. In the case of communication via a wireless network, wireless communication via an access point compliant with the Institute of Electrical and Electronics Engineers (IEEE) 802.11 may be used. Direct wireless communication such as Wi-Fi Direct® may be used. In the present exemplary embodiment, the foregoing configuration is described as an example of the printing system. However, this is not restrictive. One or more communication apparatuses and one or more printing apparatuses can be communicably connected via a network.

In the present exemplary embodiment, the single-function printers 200a to 200c are described as examples of printing apparatuses that receive a print job and print an image on a sheet. However, this is not restrictive. Apparatuses such as a multifunction peripheral (MFP) having a print function and a scan function may be used.

The present exemplary embodiment deals with a case where the printers 200a to 200c are ones manufactured by different vendors. The printers 200a to 200c receive a print job (print commands) compliant with the Internet Printing Protocol (IPP) from a computer 100, and print an image on a sheet based on the print job.

The printers 200a to 200c also have a function of receiving and interpreting a print job in different format than the IPP. For example, the printer 200a can interpret a print job including page description language (PDL) data compliant with a laser beam printer (LBP) Image Processing System (LIPS®) format. The printer 200a can further interpret a print job including PDL data compliant with a Printer Command Language (PCL®) format. The LIPS format is also referred to as an Ultra Fast Rendering (UFR®) format. The printer 200b can interpret a print job including PDL data compliant with the PCL format. The printer 200b does not support print jobs in the LIPS (UFR) format. The printer 200c is an inkjet printer and can interpret a print job compliant with Epson Standard Code for Printer (ESC/P®). The printer 200c does not support print jobs in the PCL format or the LIPS format.

As described above, printers from different vendors (manufacturers) support different types of PDLs. The same printer may support different functions depending on the type of PDL in use. The types of PDLs interpretable by the printers 200a to 200c are merely examples. Aside from the PCL, LIPS, and ESC/P formats, PDL formats interpretable by the printers 200a to 200c may include a Refined Printing Command Stream (RPCS®) format. PostScript® and Advanced Rendering Tools (ART) formats may be used. A Sharp Printer Description Language 2 (SPDL2) format may be used. Derivative formats based on the foregoing PDLs may be used. The printers 200a to 200c shall each support at least one of the foregoing PDL formats or derivative PDL formats based on the foregoing PDL formats.

Next, the computers 100 that are examples of information processing apparatuses will be described. In the present exemplary embodiment, the computers 100 are described to be personal computers (PCs). However, this is not restrictive. Terminals such as a tablet terminal and a wearable computer including a head-mounted display and a built-in computer may be used.

The computers 100 can mutually communicate with the printers 200a to 200c on the network 300. The computers 100 can generate a print job based on data to be printed, and transmit the print job to the printers 200a to 200c.

A hardware configuration of the computers 100 will be described with reference to FIG. 2. FIG. 2 is a block diagram illustrating an example of the hardware configuration of a computer 100.

A central processing unit (CPU) 101 is a processor that controls operation of an entire control unit 120. The control unit 120 includes memories, such as a read only memory (ROM) 1021, a random access memory (RAM) 1022, and a storage 105. The components of the control unit 120 are connected by a system bus 107. The control unit 120 also includes an input interface (I/F) 103 and an output I/F 104 for connecting input/output devices, and a communication I/F 106 for communicating with external apparatuses via the network 300.

The RAM 1022 is a volatile memory. The RAM 1022 is used as a work area and a temporary storage area for loading various control programs stored in the ROM 1021 and the storage 105.

The ROM 1021 is a nonvolatile memory, and stores a boot program of the computer 100. The storage 105 is a nonvolatile flash memory or hard disk drive (HDD) having a large capacity compared to the RAM 1022. The storage 105 stores an operating system (OS) 1053 for controlling the entire computer 100, and programs of various applications 1051 to run on the OS 1053. The storage 105 also stores a common printer driver 1054 that generates a print job compliant with a predetermined printing protocol, such as the IPP, and programs of setting applications 1052a to 1052c that cooperate with the common printer driver 1054. Hereinafter, the setting applications 1052a to 1052c may be referred to collectively as setting applications 1052. The predetermined printing protocol defines the common format of print commands that the printers 200a to 200c can execute.

Various applications including the applications 1051 and the setting applications 1052 can be installed on the computer 100 via a Compact Disc Read-Only Memory (CD-ROM), a Universal Serial Bus (USB) memory, or the network 300.

The CPU 101 executes the programs of the OS 1053 and various applications 1051 loaded in the RAM 1022 to control the computer 100. The pieces of hardware including the CPU 101, the ROM 1021, the RAM 1022, and the storage 105 thus constitute a computer.

While the computers 100 are described so that a single CPU 101 performs processing illustrated in flowcharts to be described below, other configurations may be employed. For example, a plurality of processors may perform the processing illustrated in the flowcharts to be described below in a cooperative manner.

The input I/F 103 connects the control unit 120 with a keyboard 108 and a pointing device 109. The keyboard 108 and the pointing device 109 function as an acceptance unit for accepting a user's instructions. The acceptance unit can detect selection of a display item, such as a key displayed on-screen. The output I/F 104 connects the control unit 120 to a monitor 110 that displays information. The monitor 110 functions as a display unit for displaying information. If the computer 100 is a tablet terminal, information is displayed to the user and operations are accepted from the user via a touch panel display serving both as the acceptance unit and the display unit. In such a case, the user can input desired operation instructions to the computer 100 by making touch operations with an object such as a finger.

The communication I/F 106 is an I/F for communicating with external apparatuses such as a printing apparatus on the network 300 and a cloud server.

<Software Configuration of Computers 100>

Next, an example of a software configuration of the computers 100 according to the present exemplary embodiment will be described with reference to FIGS. 3A, 3B, and 4.

An overall outline of data processing by software modules in a computer 100 will initially be described with reference to FIGS. 3A and 3B.

Figure 3A:
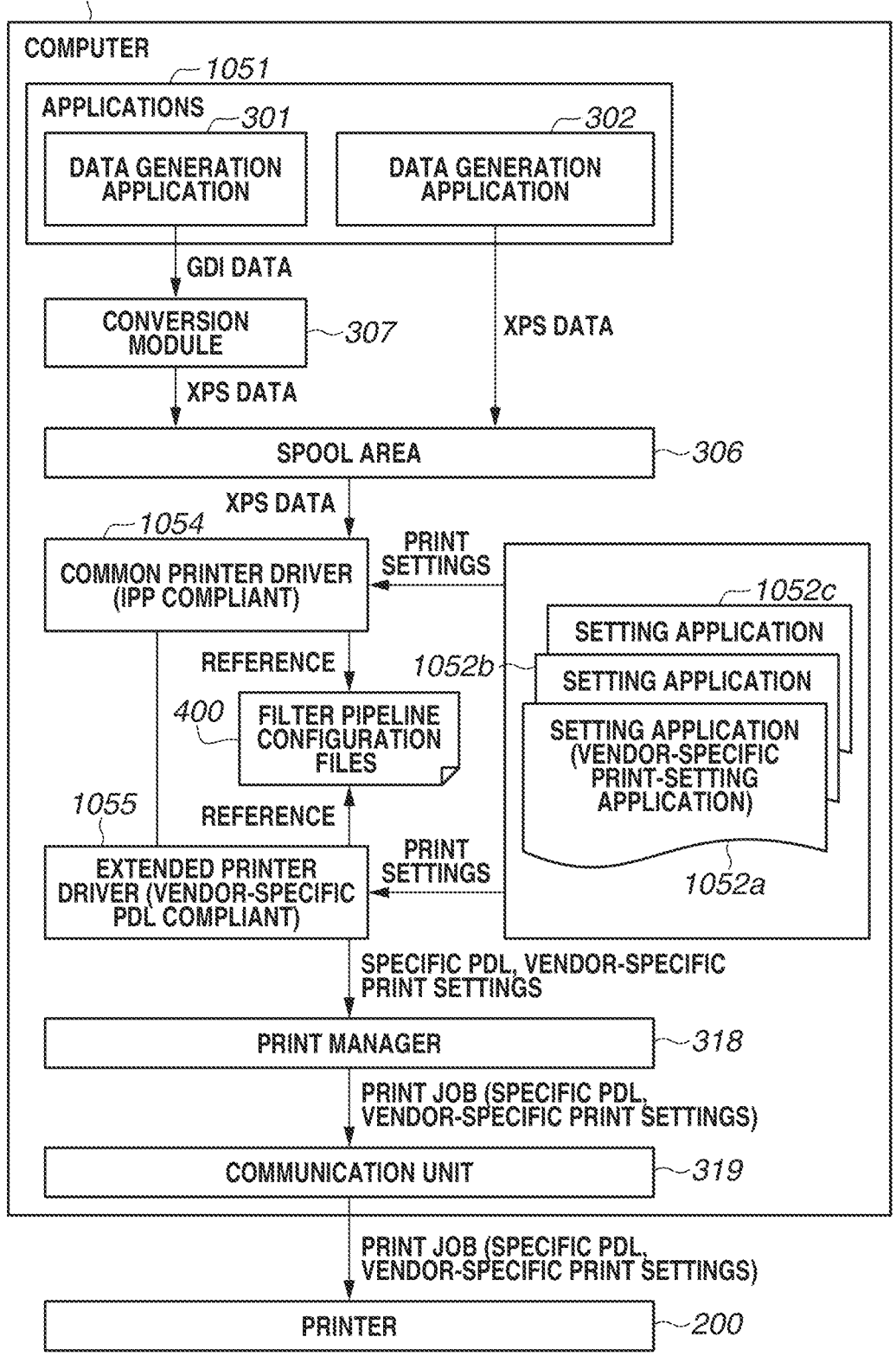
FIG. 3A is a diagram illustrating an example of a software configuration of the computer.

Each module illustrated in FIG. 3A runs on the OS 1053, which is not illustrated in FIG. 3A. The OS 1053 is system software for controlling the entire computer 100. A case where Windows® 10 or later OS is installed will be described as an example.

Data generation applications 301 and 302 generate print data based on user operations, and output the print data. Examples of the data generation applications 301 and 302 include a document generation application and an image generation application.

The user operates the data generation application 301 or 302 by using input devices such as the keyboard 108 and the pointing device 109 typified by a touch panel and a mouse.

In the present exemplary embodiment, the data generation application 301 is a Graphics Device Interface (GDI) application that performs printing by using a GDI, graphics component, for generating a print image. Examples of the data generation application 301 include a "Win32/64 application" and a ".NET application". The data generation application 301 outputs GDI drawing data as print data.

The data generation application 302 is an extension application running on the OS 1053. Examples of the data generation application 302 include a Universal Windows Platform (UWP) application. UWP applications are applications distributed through Windows® Store, and run in an execution environment different from that of the data generation application 301. Examples of the different execution environment include an individual sandbox environment (virtual environment).

In the following example, the data generation application 302 is described to generate Extensible Markup Language (XML) Paper Specification (XPS) data as print data. However, this is not restrictive. The data generation application 302 may generate print data in a data format other than XPS.

The foregoing data generation applications 301 and 302 are merely examples. Any data generation application that outputs print data to a printer driver can be used.

A conversion module 307 converts the GDI drawing data output from the data generation application 301 that is a GDI application into XPS data. In the present exemplary embodiment, the conversion module 307 is configured as one of the modules of the OS 1053.

The converted XPS data is spooled to a spool area 306. XPS data output from the data generation application 302 is also spooled to the spool area 306. In the present exemplary embodiment, the data generation application 302 is described to generate and output XPS data. However, this is not restrictive. The data generation application 302 may output data in a data format different from that of XPS data, and the OS 1053 may generate an XPS file based on drawing commands from the data generation application 302.

The common printer driver 1054 and an extended printer driver 1055 generate a print job (print commands) based on the print data stored in the spool area 306.

The common printer driver 1054 is a printer driver that generates print commands compliant with a predetermined printing protocol based on print data obtained from the applications 1051. As illustrated in FIG. 3B, the common printer driver 1054 includes a print command generation unit (rendering filter) 312. The print command generation unit 312 is a print command generation module for converting data in XPS format into print commands compliant with the IPP. The IPP is a printing protocol that all the printers 200a, 200b, and 200c from different vendors can interpret. The common printer driver 1054 may include a plurality of print command generation units. The common printer driver 1054 may be a class driver built in the OS 1053 as a standard function. The common printer driver 1054 may be a universal printer driver that the user has separately installed on the computer 100.

As illustrated in FIG. 3B, the extended printer driver 1055 includes print command generation units (rendering filters) 1 to 6 for converting data in XPS format into a print job compliant with printing protocols specific to respective printers. The print command (LIPS) generation module group, print command (PCL) generation module group, and print command (ESC/P) generation module group illustrated in FIG. 3B may be configured as respective independent extended printer drivers 1055. An extended printer driver 1055 may be configured to include more than one module group among the print command (LIPS) generation module group, print command (PCL) generation module group, and print command (ESC/P) generation module group.

The print command generation units 1 to 6 are extension modules for generating print commands compliant with other printing protocols different from the predetermined printing protocol (IPP). The other printing protocols are ones defining the format of print commands executable by one of the plurality of printers 200a to 200c and not executable by another. In the example of FIG. 3B, the print command generation units 1 and 2 are used to generate a print job compliant with a specific printing protocol usable by the printer 200a (e.g., LIPS (UFR) format). The print command generation units 3 to 5 are used to generate a print job compliant with a specific printing protocol usable by the printer 200b (e.g., PCL format). The print command generation unit 6 is used to generate a print job compliant with a specific printing protocol usable by the printer 200c (e.g., ESC/P format).

Filter pipeline configuration files 400 indicate the order in which modules used to generate a print job are called, among the one or more print command generation units included in the common printer driver 1054 and the one or more print command generation units included in the extended printer driver 1055.

FIG. 3B illustrates a case where respective filter pipeline configuration files 400 for LIPS-, PCL-, and ESC/P-supporting models are stored. However, a filter pipeline configuration file 400 for only one of the PDLs may be stored. The filter pipeline configuration file(s) 400 is/are stored in a storage medium such as the storage 105 or the ROM 1021.

XPS data (XPS spool file) obtained from the spool area 306 is processed by one or more print command generation units identified from the filter pipeline configuration files 400.

For example, the filter pipeline configuration files 400 specify the print command generation units to perform processing so that the computer 100 can output print jobs corresponding to the vendor-specific printing protocols.

For example, assume that a filter pipeline configuration file 400 includes settings so that the print command generation unit 312 performs processing and then the print command generation units 1 and 2 perform processing. In such a case, the job generation flow is as follows: The print command generation unit 312 generates print commands compliant with the IPP based on the XPS spool file. The print command generation unit 312 also generates print attributes compliant with the IPP based on standard setting data, and adds the print attributes to the print commands to generate a print job. The print job is input to the print command generation unit 1. The data processed by the print command generation unit 1 is input to the print command generation unit 2. The print command generation unit 2 generates a print job compliant with the LIPS (UFR) format. In such a manner, a print job compliant with the printing protocol specific to the printer 200a (LIPS (UFR) format) can be generated.

Return to the description of FIG. 3A. The print job generated by the common printer driver 1054 and the extended printer driver 1055 is output to a print manager 318.

The common printer driver 1054 and the extended printer driver 1055 accept print settings made by the setting applications 1052a to 1052c.

The setting applications 1052a to 1052c are print setting applications for making print settings specific to respective vendors. In the present exemplary embodiment, the setting applications 1052a to 1052c are print setting applications for making print settings specific to the printers 200a to 200c, respectively.

Examples of the print settings include a setting about the use of a stapleless binding function for binding a plurality of print pages without using a staple, and a setting about the use of a box print function for printing data stored in a predetermined storage area.

The common printer driver 1054 and the extended printer driver 1055 output a print job including the received print settings and generated print commands to the print manager 318.

The print manager 318 obtains capability information about the printers 200 and performs transmission control on a print job. The print manager 318 transmits a print job received from the common printer driver 1054 or the extended printer driver 1055 to the intended printer 200 via the communication unit 319.

In such a manner, the computer 100 can generate a print job based on the print data generated by the applications 1051 and output the print job to the printers 200.

With the foregoing configuration, a print job that the printers 200 can interpret irrespective of vendors can be generated by using the print command generation unit 312 of the common printer driver 1054. Print jobs compliant with the vendor-specific printing protocols can also be generated by using the print command generation units 1 to 6 of the extended printer driver 1055.

Next, details of the data processing by the software modules of the computer 100 will be described with reference to FIG. 3C. A description will be omitted of what has been described with reference to FIGS. 3A and 3B.

Figure 3C:
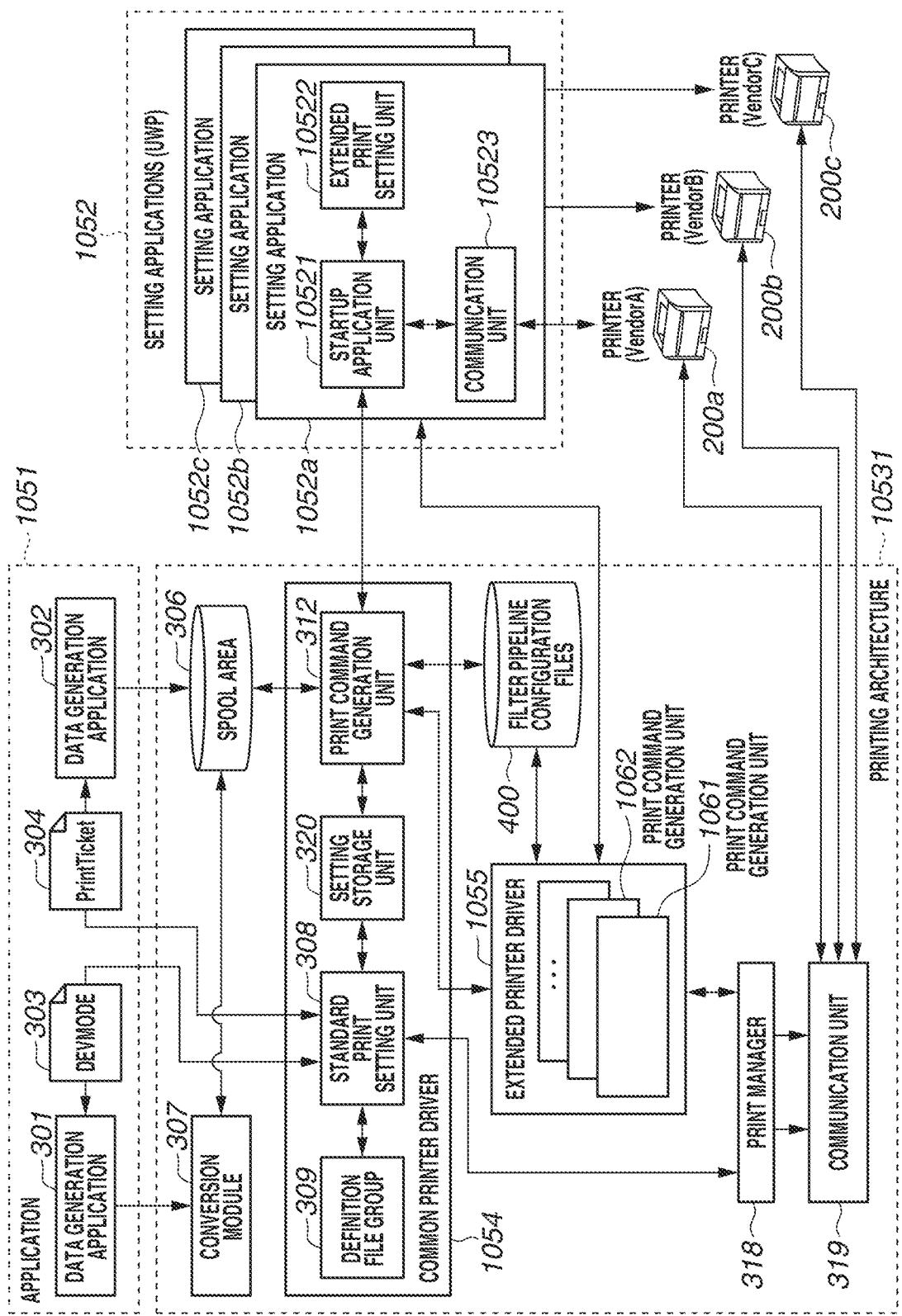
FIG. 3C is a diagram illustrating details of the software configuration of the computer.

FIG. 3C is a diagram illustrating an example of the software configuration of the computer 100 according to the present exemplary embodiment.

The OS 1053 provides a printing architecture 10531 for performing printing by using the printer drivers 1054 and 1055. The printing architecture 10531 is a version 4 (V4) printing architecture that converts spool data into print data (PDL) by using the printer drivers 1054 and 1055, with data of XPS format as the spool data.

The common printer driver 1054 supporting printers of a plurality of vendors is installed as a printer driver on the computer 100. In the present exemplary embodiment, the common printer driver 1054 processes print data compliant with a predetermined printing protocol (e.g., the IPP). The common printer driver 1054 may be a class driver built in the OS 1053 as a standard function, or a universal printer driver that the user has separately installed on the computer 100.

The printing architecture 10531 includes the conversion module 307, the common printer driver 1054, the print manager 318, and the communication unit 319. A printer driver or drivers different from the common printer driver 1054 (e.g., a model-dedicated printer driver provided by the vendor) may also be installed.

<Print Processing Using Common Printer Driver 1054>

Print processing using the common printer driver 1054 will initially be described. The data generation applications 301 and 302 generate print data (such as a document and an image) in cooperation with the printing architecture 10531.

If a print instruction is given via the applications 1051, the OS 1053 calls a standard print setting unit 308 of the common printer driver 1054. The standard print setting unit 308 refers to a definition file corresponding to the selected printer 200 in a definition file group 309 intended for standard print functions. Based on the definition file referred to, the standard print setting unit 308 generates standard setting data (DEVMODE 303 and PrintTicket 304) indicating the current print settings and PrintCapabilities indicating the print capabilities of the selected printer 200.

The standard setting data is modified as appropriate by the applications 1051 and/or via a screen (user interface) for changing the print settings, displayed by the OS 1053.

Definition files included in the definition file group 309 illustrated in FIG. 3C indicate printer capabilities generated based on attribute information obtained from the printers 200 during an IPP printer search. The definition file group 309 stores different definition files for the respective printers 200.

Next, the generation of a definition file will be described. If no definition file corresponding to the selected printer 200 is stored in the storage 105, the common printer driver 1054 inquires capability information from the printer 200. The common printer driver 1054 inquires the capability information of the printer 200 via the print manager 318 and the communication unit 319.

The print manager 318 can perform a search for IPP-supporting printers and acquisition of printer capabilities, in addition to print job control functions to be described below. Specifically, the print manager 318 obtains printer capabilities by printer attribute request operations (Get-Printer-Attributes Operations) defined in Request for Comments (RFC) 2911.

The print manager 381 initially transmits Get-Printer-Attributes Request to the printer 200. The attribute information (capability information) about the printer 200 is obtained as a response to the request. Examples of the capability information about the printer 200 obtained by printer attribute request operations include capability information about standard print settings, such as whether "two-sided printing" and "color printing" are supported. The capabilities (attributes) that can be obtained by printer attribute request operations are support information about the attributes defined by the IPP. Vendor-specific function information (such as information about a stapleless binding function and a box print function) is therefore unable to be obtained by IPP printer attribute request operations. The obtained attribute information is transferred to the standard print setting unit 308. The standard print setting unit 308 generates a definition file based on the attribute information obtained by using the IPP, and stores the definition file in the storage 105.

The applications 1051 (data generation applications 301 and 302) obtain setting data of DEVMODE format and PrintTicket format, generated by the standard print setting unit 308. The data generation application 301 uses binary DEVMODE 303 as standard setting data indicating the current print settings. The data generation application 302 uses PrintTicket 304 written in XML markup language. The DEVMODE 303 and PrintTicket 304 are standard setting data for storing print settings to be reflected on a print job compliant with the IPP. The DEVMODE 303 and PrintTicket 304 are merely examples of standard setting data, and are not restrictive.

If issuance of a print instruction by the user is detected, the OS 1053 or the applications 1051 generate(s) an XPS spool file. The generated XPS spool file is delivered to the print command generation unit 312. The print command generation unit 312 renders and converts the received XPS spool file into PDL data compliant with the IPP. Examples of the PDL data compliant with the IPP include data of Portable Document Format (PDF) format and Printer Working Group (PWG)-Raster format.

The print command generation unit 312 further generates print attribute information compliant with the IPP based on settings specified by the PrintTicket 304 included in the XPS spool file. If the PDL data compliant with the IPP and the PrintTicket 304 are properly interpretable and the print job can be properly output, the print job may be transmitted to the printer 200 without change. Specifically, the common printer driver 1054 transmits the print job processed by the print command generation unit 312 to the print manager 318 so that the print job is transmitted to the printer 200 via the communication unit 319.

<Print Processing by Extended Printer Driver 1055>

If the PDL data compliant with the IPP is not properly interpretable and the printer 200 is unable to properly output the print job, the extended printer driver 1055 for generating a print job that the printer 200 can properly output is needed.

The extended printer driver 1055 according to the present exemplary embodiment converts the PDL data compliant with the IPP into vendor-specific PDL data that the output printer 200 can properly output.

The filter pipeline configuration files 400 serve as a manual that the common printer driver 1054 and the extended printer driver 1055 refer to determine which print command generation units (hereinafter, may be referred to as rendering filters) to use in what manner.

Rendering filters are the minimum units of print processing. The common printer driver 1054 and the extended printer driver 1055 each include one or more rendering filters.

FIGS. 4A, 4B, and 4C are diagrams for describing the filter pipeline configuration files 400. Each of the filter pipeline configuration files 400 is a file in XML format compliant with the rules defined by the printing architecture 10531, and defines the order of rendering filters to be called, interfaces, and input and output formats. When calling rendering filters, the common printer driver 1054 and the extended printer driver 1055 call the rendering filters in the defined order by using the defined interfaces.

FIG. 4A illustrates a filter pipeline configuration file 400a, which is an example of the filter pipeline configuration files 400. The filter pipeline configuration file 400a defines three rendering filters (print command generation units).

Specifically, the filter pipeline configuration file 400a defines that the print command generation unit 312 of the common printer driver 1054 is the first to be called, the print command generation unit 1 of the extended printer driver 1055 the next, and the print command generation unit 2 of the extended printer driver 1055 the next.

In FIG. 4A, the print command generation unit 312 of the common printer driver 1054 is represented as "XPS to PDF". In FIG. 4A, the print command generation unit 1 of the extended printer driver 1055 is represented as "Vendor Renderer PDL A". In FIG. 4A, the print command generation unit 2 of the extended printer driver 1055 is represented as "Vendor Renderer PDL B".

The extended printer driver 1055 calls the rendering filters in the order described in the filter pipeline configuration file 400a, and transmits the final PDL data generated to the print manager 318. That is, when all the filter processing defined in the filter pipeline configuration file 400a is completed, the extended printer driver 1055 transmits the generated vendor-specific PDL data and extended print setting information to the printer 200 as a print job.

The print manager 318 having received the PDL data generates a print job, and registers the generated print job in a queue. If the printer 200 enters a printable state, the print manager 318 transmits print jobs via the communication unit 319 in the order of registration in the queue.

The setting applications 1052 provide the functions of displaying a preview of print data and displaying a user interface for prompting a change in print settings. The setting applications 1052 are applications running on a UWP platform different from the printing architecture 10531. The setting applications 1052 are intended to enable more flexible use of the functions of the printers 200 according to need, based on the IPP-based printing by the common printer driver 1054.

The setting applications 1052 run in a sandboxed UWP execution environment. This can reduce an impact on the entire system if any setting application 1052 causes a hang-up or error. In the present exemplary embodiment, a case is assumed where an extended print setting unit 10522 of the setting application 1052a is activated to add extended print settings to a print job. However, extended print settings do not necessarily need to be added.

A case where the setting application 1052a is installed as a setting application corresponding to the printer 200a will be described. Here, the setting application 1052b is described to be installed as one corresponding to the printer 200b. The setting application 1052c is described to be installed as one corresponding to the printer 200c.

The print command generation unit 312 determines whether to activate the setting applications 1052 based on the installation statuses of the extension applications and settings stored in a setting storage unit 320.

The setting applications 1052 each include a startup application unit 10521, an extended print setting unit 10522, and a communication unit 10523.

The startup application unit 10521 is a module to be called at the time of printing. The startup application unit 10521 controls the activation and operation of the extended print setting unit 10522 and the communication unit 10523.

The extended print setting unit 10522 displays an extended user interface on the monitor 110. The extended user interface is capable of more detailed print settings than the print settings compliant with the IPP. The extended user interface is displayed on the monitor 110 at timing when the user gives an instruction to start print settings or a print preview instruction from the applications 1051.

The communication unit 10523 provides function of performing communication with the printer 200 to the modules of the setting application 1052. The communication unit 10523 obtains information about the printer 200 by using a specific communication method or specific control method.

Examples of the specific communication method include the Web Services for Devices (WSD) protocol and the Simple Network Management Protocol (SNMP). Communication methods using vendor-specific protocols may be included. Information about the printer 200 can also be obtained by using control commands defined in a job control language or printer control language. For example, the communication unit 10523 may request information from the Printer 200 by using commands defined in Printer Job Language (PJL), PostScript, or Common Peripheral Controlling Architecture (CPCA). The Network Printing Alliance Protocol (NPAP) may be used to obtain information from the printer 200.

The print command generation units 1 to 6 of the extended printer driver 1055 communicate with the setting applications 1052 and obtain extended print settings as needed. The obtained extended print settings can be reflected on the vendor-specific PDL data.

<Method for Installing Extended Printer Driver 1055>

Next, a method for installing the extended printer driver 1055 will be described with reference to the flowchart of FIG. 5. The processing illustrated in FIG. 5 is implemented by the CPU 101 reading programs for implementing the respective control modules, stored in the ROM 1021 or the storage 105, into the RAM 1022 and executing the programs.

An installation package of the extended printer driver 1055 will initially be described. The installation package of the extended printer driver 1055 uses the mechanism of an extension Setup Information (INF) file. An extension INF file refers to a file based on "extension INF" defined by Microsoft® Windows®. An extension INF file including the same identifiers (IDs) as the Hardware ID (HWID) and component ID (COID) described in a basic INF file is prepared to define modules to be added to a basic package. Installation using the extension INF file overwrites modules described in the basic INF file or installs additional modules.

Figure 6:
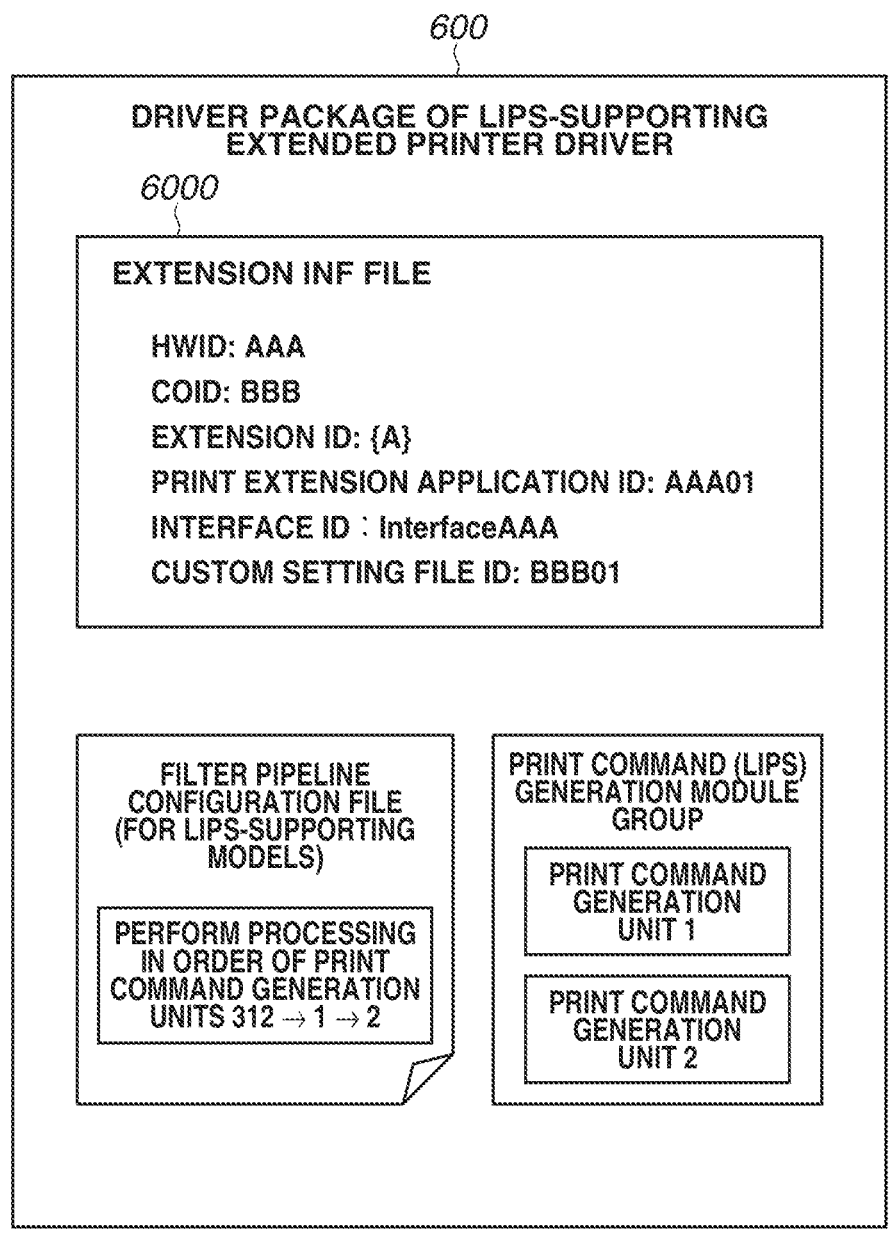
FIG. 6 is a diagram for describing an example of a driver package.

FIG. 6 illustrates an example of a driver package 600 for installing an LIPS-supporting extended printer driver 1055. The driver package 600 includes an extension INF file 6000, a filter pipeline configuration file, and a print command generation module group.

The extension INF file 6000 shows the HWID and COID of the corresponding basic INF file. The basic INF file is an INF file for the common printer driver 1054.

A method for installing the extended printer driver 1055 by using the extension INF file will be described. In step S501, the OS 1053 initially determines whether the INF file to be installed is an extension INF file.

If the extended printer driver 1055 determines that the INF file to be installed is not an extension INF file (NO in step S501), the processing proceeds to step S502. In step S502, the OS 1053 performs normal INF installation.

If the extended printer driver 1055 determines that the INF file to be installed is an extension INF file (YES in step S501), the processing proceeds to step S503. In step S503, the OS 1053 checks the HWID and COID. The OS 1053 searches for a basic INF file defining the same HWID and COID as those described in the extension INF file.

If, as a result of the search, there is found no basic INF file defining the HWID and COID (NO in step S504), the installation processing ends.

If, as a result of the search, there is found a basic INF file defining the HWID and COID (YES in step S504), the processing proceeds to step S505. In step S505, the OS 1053 performs processing for extending the modules of the basic INF file with the modules of the print command generation unit 1 and 2.

In the present exemplary embodiment, the filter pipeline configuration file included in the driver package 600 is stored in a location accessible to the common printer driver 1054. If there already is a filter pipeline configuration file 400, the filter pipeline configuration file 400 is overwritten. Alternatively, a new filter pipeline configuration file 400 may be stored in addition to the existing filter pipeline configuration file 400 instead of overwriting.

The print command generation units 1 and 2 are stored in a location accessible to the extended printer driver 1055. If vendor extension print processing unit modules (print command generation units) having the same names already exist in the storage location, the files are overwritten.

The extended printer driver 1055 can be installed on the computer 100 through such a procedure.

In the example of FIG. 6, the installation of an LIPS-supporting extended printer driver 1055 has been described. However, an extended printer driver 1055 supporting a plurality of PDLs such as LIPS, PCL, and ESC/P may be installed.

<Print Job Generation Flow>

A procedure for generating a print job by a computer 100 according to the present exemplary embodiment will be described with reference to FIG. 7. FIG. 7 is a flowchart illustrating control of the computer 100. The operations (steps) illustrated in the flowchart of FIG. 7 are implemented by the CPU 101 reading the programs for implementing the respective control modules, stored in the ROM 1021 or the storage 105, into the RAM 1022 and executing the programs. Each process illustrated in the flowchart is implemented by cooperation of the modules and software components of the applications 1051, the OS 1053, the common printer driver 1054, and the extended printer driver 1055. Some of the processes, such as data transmission and information input/output, are implemented in cooperation with the I/Fs.

The flowchart of FIG. 7 illustrates processing in a case where a printer 200 that the common printer driver 1054 is unable to support by itself is specified as the printer to be used, and in which the extended printer driver 1055 installed in advance is also used to generate a print job. Such processing is performed in response to acceptance of an instruction intended for printing from the user.

In step S701, an application 1051 accepts a print job generation command from the user. For example, the application 1051 accepts the print job generation command based on pressing of a print button key.

In step S702, the application 1051 outputs drawing data. In step S703, the OS 1053 generates an XPS spool file based on the output drawing data. If the printing is originated by the data generation application 301, the OS 1053 generates the XPS spool file by using the conversion module 307.

In step S704, the OS 1053 determines whether extended print modules are installed on the computer 100. For example, if the extension INF file 6000 is installed on the computer 100, the OS 1053 can determine that extended print modules are installed. In the example of FIG. 6, the extended print modules refer to the print command generation units 1 and 2. In the example of FIG. 3B, the extended print modules refer to the print command generation units 1 to 6.

If the OS 1053 determines that no extended print module is installed (NO in step S704), the processing proceeds to step S705. In step S705, the print command generation unit 312 of the common printer driver 1054 processes the XPS spool file to generate print commands compliant with the IPP.

In step S705, the print command generation unit 312 converts the XPS spool file into PDL data compliant with the IPP. The print command generation unit 312 also generates print settings (print attributes) compliant with the IPP based on standard settings representing print settings to be set in a print job.

If the OS 1053 determines that extended print modules are installed (YES in step S704), the processing proceeds to step S706. In step S706, the printing architecture 10531 analyzes the print job and identifies identification information about the printer 200 to execute the print job.

In step S707, the printing architecture 10531 performs identification processing for identifying the filter pipeline configuration file 400 corresponding to the identification information about the printer 200 identified in step S706. The identification information about the printer 200 and the filter pipeline configuration file 400 do not need to be directly associated with each other. For example, the identification information about the printer 200 and the filter pipeline configuration file 400 may be indirectly associated in such a manner that a printing protocol to be used is identified based on the identification information about the printer 200, and then a filter pipeline configuration file 400 for generating a print command corresponding to the identified printing protocol is identified. For example, if the specified printer 200 supports LIPS, the printing architecture 10531 identifies a filter pipeline configuration file 400 that specifies one or more print command generation units to be used to generate a print command compliant with the LIPS. In such a manner, the filter pipeline configuration file 400 to be referred to is identified based on the information indicating the format of print data that the printing apparatus to perform printing uses for print processing.

In step S708, the printing architecture 10531 determines whether a filter pipeline configuration file 400 to be referred to is identified in step S707. If no filter pipeline configuration file 400 to be referred to is identified (NO in step S708), the processing proceeds to step S705. In step S705, the printing architecture 10531 generates print commands by using the common printer driver 1054. Examples of the case where no filter pipeline configuration file 400 to be referred to is identified include when the filter pipeline configuration file 400 corresponding to the printing protocol specific to the printer 200 to perform printing is not stored in the computer 100. In such a case, i.e., if the filter pipeline configuration file 400 for generating print commands compliant with the format of print data that the printing apparatus to perform printing uses for print processing is not stored, the computer 100 outputs print commands compliant with a predetermined protocol.

If no filter pipeline configuration file 400 to be referred to is identified, the printing architecture 10531 may issue a notification indicating that the printing by using the printing protocol specific to the printer 200 specified as the print destination will not be performed. Alternatively, the printing architecture 10531 may issue a notification that printing will be performed by using the common printing protocol (such as the IPP).

If the filter pipeline configuration file 400 to be referred to is identified in step S707 (YES in step S708), the processing proceeds to step S709. In step S709, the printing architecture 10531 generates print commands based on the identified filter pipeline configuration file 400. More specifically, the printing architecture 10531 generates print commands by using one or more print command generation units specified by the identified filter pipeline configuration file 400 in the specified order.

For example, if the filter pipeline configuration file 400a illustrated in FIG. 4A is referred to, the print command generation unit 312 of the common printer driver 1054 and the print command generation units 1 and 2 of the extended printer driver 1055 process the print data in such order. The print command generation unit 1 corresponds to "Vendor Renderer PDL A" in FIG. 4A. The print command generation unit 2 corresponds to "Vendor Renderer PDL B" in FIG. 4A.

The print command generation unit 312 initially generates print data compliant with the IPP. The print command generation unit 312 also generates print settings compliant with the IPP based on the standard settings representing the print settings to be set in a print job.

Next, the print data and the print settings generated by the print command generation unit 312 are output to the print command generation unit 1. The print command generation units 1 and 2 can generate print commands compliant with another printing protocol based on the print commands that the common printer driver 1054 has generated based on the predetermined printing protocol (such as the IPP). For example, the print command generation units 1 and 2 generate print commands corresponding to LIPS from the print data received from the common printer driver 1054.

The print command generation units 1 and 2 further obtains extended print settings from the setting application 1052a corresponding to the specified printer 200. The print command generation units 1 and 2 generate print settings specific to the specified printer 200 based on the standard settings received from the print command generation unit 312 and the extended print settings obtained from the setting application 1052a.

The print settings are output to the print manager 318 along with the generated print commands. In the foregoing example, the print command generation units 1 and 2 and the setting application 1052a are described to be used. Depending on the specified printer 200, print command generation units and setting applications 1052 other than the foregoing are used.

With the print commands generated in step S705 or S709, the print manager 318 generates a print job based on the generated print commands and print settings. In step S710, the print manager 318 transmits the generated print job to the specified printer 200 via the communication unit 319.

In such a manner, the print manager 318 outputs print commands compliant with the specific printing protocol, obtained through processing of the print data obtained by the common printer driver 1054, which is performed by one or more modules indicated by the filter pipeline configuration file 400. The print manager 318 thereby outputs first print commands or second print commands depending on the information indicating the format of print data that the printing apparatus to perform printing uses for the print processing. The first print commands refer to print commands compliant with a predetermined protocol (e.g., the IPP). The second print commands refer to print commands compliant with another printing protocol different from the predetermined printing protocol.

In the case of outputting the print commands generated in step S705, the print manager 318 outputs print commands compliant with the IPP. The print manager 318 can thus output first print commands compliant with a predetermined printing protocol (e.g., the IPP) based on the print data obtained from the application 1051.

In the case of outputting the print commands generated in step S709, the print manager 318 can output print commands compliant with another printing protocol different from the predetermined printing protocol based on the print data obtained from the application 1051.

According to the foregoing exemplary embodiment, the computer 100 uses the common printer driver 1054 that can use a predetermined printing protocol such as the IPP. The computer 100 can thus output print commands irrespective of the vendors of the printing apparatuses. According to the foregoing exemplary embodiment, the computer 100 can also output print commands using a specific printing protocol different from the predetermined printing protocol. This enables the user to use specific print functions that become available by using the specific printing protocol.

A second exemplary embodiment of the present disclosure will be described below. In the first exemplary embodiment, the common printer driver 1054 is described to generate PDL data compliant with the IPP before the extended printer driver 1055 is used to convert the PDL data into the vendor-specific PDL data and generate print commands. However, this is not restrictive. The print command generation units of the extended printer driver 1055 may be called to generate print commands without the intervention of the print command generation unit 312 of the common printer driver 1054.

A hardware configuration, a software configuration, and a processing procedure according to the present exemplary embodiment are similar to those described in the first exemplary embodiment. A description thereof will thus be omitted. A difference is that the extended printer driver 1055 according to the present exemplary embodiment has a function of interpreting XPS data generated by the applications 1051 instead of PDL compliant with the IPP, and converting the XPS data into vendor-specific PDL data.

When an application 1051 accepts a print start instruction from the user, the application 1051 passes print settings and an XPS spool file to the common printer driver 1054.

A case where a filter pipeline configuration file 400*b* illustrated in FIG. 4B is selected as the filter pipeline configuration file to be referred to in step S707 of FIG. 7 will be described.

The filter pipeline configuration file 400*b* includes definitions for only the print command generation units 1 and 2. The print command generation unit 1 corresponds to "Vendor Renderer PDL A" in FIG. 4B. The print command generation unit 2 corresponds to "Vendor Renderer PDL B" in FIG. 4B.

Based on the filter pipeline configuration file 400*b*, the common printer driver 1054 passes the obtained print settings and XPS spool file to the extended printer driver 1055 without calling the print command generation unit 312.

In step S709 of FIG. 7, the extended printer driver 1055 generates print commands based on the XPS spool file by using the print command generation units 1 and 2 based on the filter pipeline configuration file 400*b*. The extended printer driver 1055 also generates print settings specific to the specified printer 200 based on the print settings obtained from the common printer driver 1054 and the extended print settings obtained from the setting application 1052*a*.

With the print commands generated in step S709, the print manager 318 generates a print job based on the generated print commands and print settings. In step S710, the print manager 318 transmits the generated print job to the specified printer 200 via the communication unit 319.

In the present exemplary embodiment, a print job including vendor-specific certain PDL data is generated without calling the print command generation unit 312 of the common printer driver 1054 compliant with the IPP. More specifically, the extended printer driver 1055 can generate print commands compliant with another printing protocol different from a predetermined printing protocol (e.g., the IPP) without the generation of print commands by the common printer driver 1054. The extended printer driver 1055 generates the print commands compliant with another printing protocol by using the print data output from the application 1051.

The print manager 318 can output print commands compliant with another printing protocol, generated by one or more extension modules without the common printer driver 1054 generating print commands in compliance with the predetermined printing protocol. This can reduce the amount of processing for generating print commands and more efficiently generate print commands than via the common printer driver 1054.

A third exemplary embodiment of the present disclosure will be described below. In the first and second exemplary embodiments, the extended printer driver 1055 installed on the computer 100 is described to be used to convert PDL data compliant with the IPP or an XPS spool file into vendor-specific PDL data and generate print commands. However, this is not restrictive. Print commands may be generated by using a print command generation unit included in an external apparatus (such as a cloud server) connected to the computer 100 via a network.

A hardware configuration, a software configuration, and a processing procedure according to the present exemplary embodiment are similar to those described in the first exemplary embodiment. A description thereof will thus be omitted.

A difference is that the communication unit 319 according to the present exemplary embodiment communicates with an external apparatus connected to a client computer via a network, based on instructions from the extended printer driver 1055. In the present exemplary embodiment, the extended printer driver 1055 generates print commands by using a print command generation unit 8 on the external apparatus.

A case where a filter pipeline configuration file 400*c* illustrated in FIG. 4C is selected as the filter pipeline configuration file to be referred to in step S707 of FIG. 7 will be described.

The print command generation unit 1 corresponds to "Vendor Renderer PDL A" in FIG. 4C. The print command generation unit 2 corresponds to "Vendor Renderer PDL B" in FIG. 4C. The print command generation unit 8 corresponds to "Vendor Renderer PDL C" in FIG. 4C.

The filter pipeline configuration file 400*c* defines a Uniform Resource Locator (URL) for using the print command generation unit 8 on the external apparatus. Based on the definition, the extended printer driver 1055 calls the print command generation unit 8 located in a cloud area via the communication 319, and generates print commands. In the example of FIG. 4C, the extended printer driver 1055 performs processing by using the print command generation units 1 and 2, and then transmits the processed data to the print command generation unit 8. The extended printer driver 1055 then transmits the print data (print commands) processed by the print command generation unit 8 to the print manager 318.

The print manager 318 generates a print job based on the generated print commands and print settings. In step S710, the print manager 318 transmits the generated print job to the specified printer 200 via the communication unit 319.

In the foregoing example, the print commands are described to be generated by using the print command generation units 1, 2, and 8. However, this is not restrictive. The print command generation unit 312 may perform processing before the print command generation unit 1. Alternatively, print commands may be generated from the XPS spool data by using only the print command generation unit 8.

In such a manner, the print manager 318 according to the present exemplary embodiment outputs print commands compliant with another printing protocol, obtained through processing of the print data obtained by the common printer driver 1054, which is performed by the extension module included in the external apparatus. The extension module included in the external apparatus is an extension module for generating print commands compliant with another printing protocol different from a predetermined printing protocol.

According to the present exemplary embodiment, print commands are generated by using the print command generation unit 8 on the external apparatus such as a cloud server. This can improve extensibility, compared to when only the print command generation units installed on the computer 100 are used. In other words, print commands written in a type of PDL not generable by only the computer 100 can be generated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus that stores a computer program configured to be executed by one or more processors of the information processing apparatus having a driver corresponding to a plurality of printers of a plurality of vendors, the computer program being different from the driver and the computer program being not included in the driver, the information processing apparatus comprising:

a first converting unit configured to convert print data of a first type of page description language to print data of a second type of page description language being able to be interpretable by a first printing apparatus, the print data of the first type of page description language being output by the driver based on a print setting received from a user via a print setting screen provided by an operating system of the information processing apparatus, the print data of the first type of page description language being converted to the print data of the second type of page description language based on another print setting received from the user via a first print setting screen displayed by executing a first program, the first program being different from the driver and corresponding to the first printing apparatus; and a second converting unit configured to convert print data of the first type of page description language to print data of a third type of page description language being able to be interpretable by a second printing apparatus, the print data of the first type of page description language being output by the driver based on a print setting received from a user via the print setting screen provided by the operating system of the information processing apparatus, the print data of the first type of page description language being converted to the print data of the third type of page description language based on another print setting received from the user via a second print setting screen displayed by executing a second program, the second program being different from the driver and corresponding to the second printing apparatus, the print data of the third type of page description language being not interpretable by the first printing apparatus.

2. A non-transitory computer-readable storage medium that stores a computer program configured to be executed by one or more processors of an information processing apparatus having a driver corresponding to a plurality of printers of a plurality of vendors, the computer program being different from the driver and the computer program being not included in the driver, the computer program including instructions, which when executed by the one or more processors, cause the information processing apparatus to:

convert print data of a first type of page description language to print data of a second type of page description language being able to be interpretable by a first printing apparatus, the print data of the first type of page description language being output by the driver based on a print setting received from a user via a print setting screen provided by an operating system of the information processing apparatus, the print data of the first type of page description language being converted to the print data of the second type of page description language based on another print setting received from the user via a first print setting screen displayed by executing a first program, the first program being different from the driver and corresponding to the first printing apparatus; and convert print data of the first type of page description language to print data of a third type of page description language being able to be interpretable by a second printing apparatus, the print data of the first type of page description language being output by the driver based on a print setting received from a user via the print setting screen provided by the operating system of the information processing apparatus, the print data of the first type of page description language being converted to the print data of the third type of page description language based on another print setting received from the user via a second print setting screen displayed by executing a second program, the second program being different from the driver and corresponding to the second printing apparatus, the print data of the third type of page description language being not interpretable by the first printing apparatus.

3. The non-transitory computer-readable storage medium according to claim 2, wherein the print data of the first type of page description language is converted to the print data of the second type of page description language in a case where the first printing apparatus is selected, and wherein the print data of the first type of page description language is converted to the print data of the third type of page description language in a case where the second printing apparatus is selected.

4. The non-transitory computer-readable storage medium according to claim 2, wherein, in a case where first extended information corresponding to the first printing apparatus is not stored in the information processing apparatus, the print data of the first type of page description language is transmitted without being converted from the print data of the first type of page description language.

5. The non-transitory computer-readable storage medium according to claim 2, wherein the print data of the first type of page description language is print data that is compliant with Internet Printing Protocol.

6. The non-transitory computer-readable storage medium according to claim 2, wherein the driver converts data generated by a data generation application to the print data of the first type of page description language based on the print setting received from the user via the print setting screen provided by the operating system of the information processing apparatus.

7. The non-transitory computer-readable storage medium according to claim 2, wherein first extended information corresponding to the first printing apparatus is information regarding a method for rendering print data of a PDF format to the print data of the first type of page description language.

8. The non-transitory computer-readable storage medium according to claim 2, wherein the another print setting received from the user via the second print setting screen displayed by executing the second program is a setting value regarding a function for storing another print data to a printing apparatus.

9. The non-transitory computer-readable storage medium according to claim 2, wherein the another print setting received from the user via the second print setting screen displayed by executing the second program is a setting value regarding a function for binding sheets without a staple.

10. A control method for controlling an information processing apparatus that stores a computer program configured to be executed by one or more processors of the information processing apparatus having a driver corresponding to a plurality of printers of a plurality of vendors, the computer program being different from the driver and the computer program being not included in the driver, the control method comprising:

converting print data of a first type of page description language to print data of a second type of page description language being able to be interpretable by a first printing apparatus, the print data of the first type of page description language being output by the driver based on a print setting received from a user via a print setting screen provided by an operating system of the information processing apparatus, the print data of the first type of page description language being converted to the print data of the second type of page description language based on another print setting received from the user via a first print setting screen displayed by executing a first program, the first program being different from the driver and corresponding to the first printing apparatus; and converting print data of the first type of page description language to print data of a third type of page description language being able to be interpretable by a second printing apparatus, the print data of the first type of page description language being output by the driver based on a print setting received from a user via the print setting screen provided by the operating system of the information processing apparatus, the print data of the first type of page description language being converted to the print data of the third type of page description language based on another print setting received from the user via a second print setting screen displayed by executing a second program, the second program being different from the driver and corresponding to the second printing apparatus, the print data of the third type of page description language being not interpretable by the first printing apparatus.

* * * * *